(12) United States Patent
Yu et al.

(10) Patent No.: US 8,568,599 B1
(45) Date of Patent: Oct. 29, 2013

(54) TOUCH PANEL FABRICATING METHOD

(71) Applicant: Chunghwa Picture Tubes, Ltd., Taoyuan (TW)

(72) Inventors: Chia-Wei Yu, Taoyuan County (TW); Chi-Ming Chiou, Taoyuan County (TW); Ya-Ju Lu, New Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/655,448

(22) Filed: Oct. 19, 2012

(30) Foreign Application Priority Data

Jul. 13, 2012 (TW) .............................. 101125396 A

(51) Int. Cl.
*H01B 13/00* (2006.01)

(52) U.S. Cl.
USPC .................. 216/13; 216/15; 216/24; 216/75; 216/76

(58) Field of Classification Search
USPC .................................... 216/13, 15, 24, 75, 76
See application file for complete search history.

(56) References Cited

U.S. PATENT DOCUMENTS

| | | | |
|---|---|---|---|
| 2011/0227840 A1* | 9/2011 | Sim et al. .................. | 345/173 |
| 2013/0043068 A1* | 2/2013 | Xie et al. .................. | 174/262 |
| 2013/0048353 A1* | 2/2013 | Lin et al. .................. | 174/257 |
| 2013/0056342 A1* | 3/2013 | Wang et al. .................. | 200/600 |
| 2013/0075778 A1* | 3/2013 | Nakanishi et al. ............. | 257/99 |
| 2013/0082944 A1* | 4/2013 | Juan et al. .................. | 345/173 |

FOREIGN PATENT DOCUMENTS

| | | |
|---|---|---|
| TW | I289282 | 11/2007 |
| TW | 201118687 | 6/2011 |

* cited by examiner

*Primary Examiner* — Binh X Tran
(74) *Attorney, Agent, or Firm* — CKC & Partners Co., Ltd.

(57) ABSTRACT

A touch panel fabricating method is disclosed. A first conductive layer, a second conductive layer and a first photo-resist layer are sequentially formed on a substrate. Next, the first photo-resist layer is patterned by using a gray-level mask. Then, the first conductive layer and the second conductive layer are etched according to the patterned first photo-resist layer to define a plurality of first sensing electrodes. Then, an insulation layer is formed on the substrate and the first sensing electrodes. The insulation layer is patterned by using a gray-level mask. Then, a third conductive layer is formed on the patterned insulation layer. A second photo-resist layer is formed on the third conductive layer. The second photo-resist layer is patterned to expose partial third conductive layer. Then, the exposed third conductive layer is etched to define a plurality of second sensing electrodes.

13 Claims, 19 Drawing Sheets

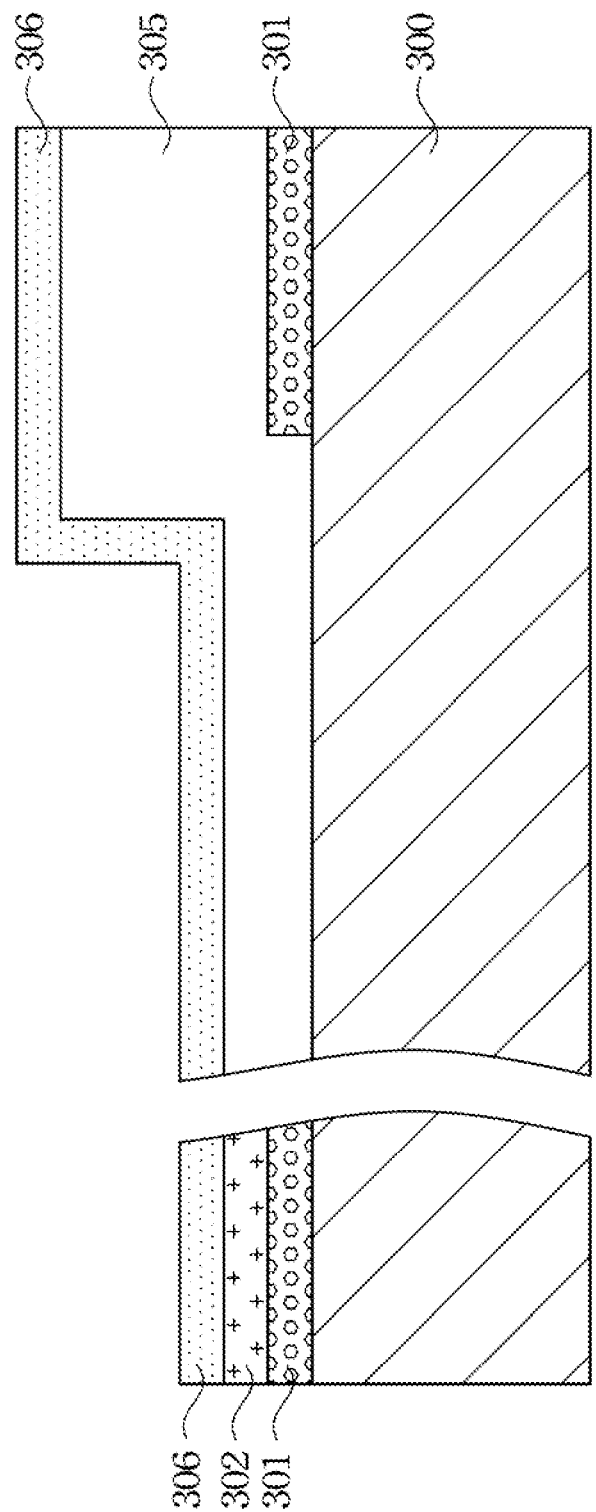

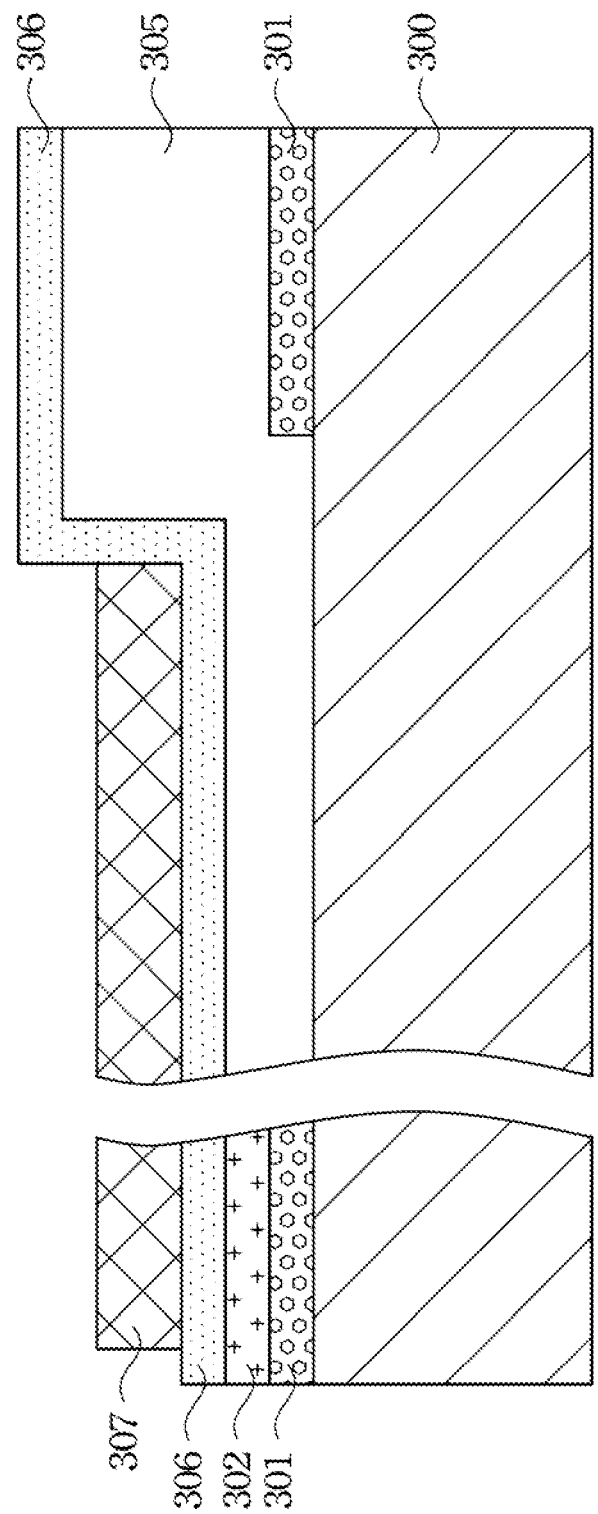

TOUCH PANEL FABRICATING METHOD

RELATED APPLICATION

This application claims priority to Taiwan Application Serial Number 101125396, filed Jul. 13, 1012, which is herein incorporated by reference.

BACKGROUND

1. Field of Invention

The present invention relates to a touch panel, and more particularly to a fabricating method for an electrode of a touch panel.

2. Description of Related Art

Recently, more and more electronic appliances adopt a touch panel to be as an input device and a display device. The touch panel performs an input function through the touch of an image displayed thereon by a writing utensil such as a stylus pen or a finger.

The touch panel is mainly classified as a resistive touch panel and a capacitive touch panel. In the resistive touch panel, glass is shorted with an electrode under the pressure of the writing utensil so that a touch point of the writing utensil is detected. In the capacitive touch panel, the variation in capacitance between electrodes is detected when a finger of the user touched on the capacitive touch panel, so that the touch point of the finger is detected.

A conventional capacitive type touch panel is described with reference to FIG. 1 and FIG. 2. FIG. 1 is a top view illustrating the conventional capacitive type touch panel, a touch panel 100. FIG. 2 is a cross-sectional view illustrating the touch panel taken along line A-A' of FIG. 1. The electrode 102 of the touch panel 100 is formed on a substrate 101. The electrode 102 includes a plurality of first sensing electrodes 102a arranged in parallel in a first direction (for example, an X-axis direction) and a plurality of second sensing electrodes 102b arranged to intersect in a direction (for example, an Y-axis direction) perpendicular to the first sensing electrodes 102a. The first sensing electrodes 102a and the second sensing electrodes 102b are interlaced but insulated with each other by a first insulation film 103 and a second insulation film 105. Further, neighboring first sensing electrodes 102a arranged in the first direction are connected to each other by a metal bridge 104. That is, the metal bridge 104 connects the neighboring first sensing electrodes 102a and second sensing electrodes 102b.

Conventionally, a method of manufacturing a capacitive type touch panel includes four processes. First, a first metal layer is deposited on the substrate 101. Then, the first metal layer is patterned by performing a photolithography process by applying a first mask to form the metal bridge 104. Next, a photo-resist layer is deposited on the metal bridge 104. The photo-resist layer is patterned by performing a photolithography process using a second mask to form a first insulation layer 103. A second metal layer is deposited on the first insulation layer 103 and the metal bridge 104. Then, the second metal layer is patterned by performing a photolithography process using a third mask to form the first sensing electrodes 102a and second sensing electrodes 102b. A photo-resist layer is deposited on the first sensing electrodes 102a and the second sensing electrodes 102b. The fourth mask is applied to form a second insulation layer 105.

However, the conventional capacitive type touch panel is manufactured with 4 mask processes, and each mask process accompanies a photolithography process requiring a series of continuous processes such as photo-resist (PR), coating, alignment, exposure, development, and cleaning. As such, there are still needs to reduce the number of the process steps for the mask process.

SUMMARY

An object of this invention is to provide a touch panel that may reduces mask process number of a capacitive type touch panel.

The present invention provides a method of fabricating a touch panel. A first conductive layer, a second conductive layer and a first photo-resist layer are sequentially formed on a substrate. Next, the first photo-resist layer is patterned to expose partial first conductive layer and partial second conductive layer applying a first gray-level mask. Then, the exposed first conductive layer and exposed second conductive layer are removed to define a plurality of the first sensing electrodes of the touch panel by performing an etching process using the patterned first photo-resist layer. Next, a first insulation layer is formed on the substrate and the first sensing electrodes. Then, the first insulation layer is patterned by applying a second gray-level mask. The patterned first insulation layer has different thickness. The position of the patterned first insulation layer covering the first sensing electrodes has the largest thickness. A third conductive layer is formed on the patterned first insulation layer. A second photo-resist layer is formed on the third conductive layer. The second photo-resist layer is patterned to expose partial third conductive layer. Then, the exposed third conductive layer is removed to define a plurality of the second sensing electrodes of the touch panel by performing an etching process.

In an embodiment, the material of the first conductive layer and the third conductive layer is indium tin oxide (ITO). The material of the second conductive layer is indium tin oxide or a compound metal. The compound metal is selected from Pd, Pt, Au, Ag, Cr, Al, AlNd or combinations thereof.

In an embodiment, the first conductive layer, the second conductive and the third conductive layer are etched by a wet etching process or a dry etching process.

In an embodiment, the step of using a first gray-level mask to pattern the first photo-resist layer further comprises to pattern the first photo-resist layer located in a position of the first sensing electrodes to be formed to have a first thickness and a second thickness, and to remove the first photo-resist layer located in a position of the second sensing electrodes to be predefined formed. The second thickness is less than the first thickness.

In an embodiment, the step of removing the exposed first conductive layer and exposed second conductive layer to define the first sensing electrodes of the touch panel further comprises using the patterned first photo-resist layer to etch the second conductive layer and the first conductive layer to expose the substrate located in the position of the second sensing electrodes to be formed, to remove the second thickness and form the patterned first photo-resist layer to expose the second conductive layer located in the position of the second sensing electrodes to be formed, to etch the exposed second conductive layer to expose the first conductive layer, and to remove the patterned first photo-resist layer.

In an embodiment, an annealing process is performed before etching the exposed second conductive layer to expose the first conductive layer.

In an embodiment, a second insulation layer is formed on the first sensing electrodes and the second sensing electrodes. The first insulation layer and the second insulation layer are organic photo-resist layers.

In an embodiment, the step of using the patterned first photo-resist layer to etch the first conductive layer and the second conductive layer to define the first sensing electrodes of the touch panel further comprises defining a first connection pad on the substrate. The first connection pad is connected to the first sensing electrodes.

In an embodiment, which a second gray-level mask is applied to pattern the first insulation layer further comprises to expose the first connection pad. A third conductive layer is formed on the exposed first connection pad to form a second connection pad. The second connection pad is connected to the second sensing electrode.

Accordingly, in the present invention a gray-level mask is applied to define the electrodes, X-axis direction electrodes and Y-axis direction electrodes. Therefore, the typical four mask processes may be reduced to three mask processes, such that the fabrication cost and time are much reduced.

BRIEF DESCRIPTION OF THE DRAWINGS

In order to make the foregoing as well as other aspects, features, advantages, and embodiments of the present invention more apparent, the accompanying drawings are described as follows:

FIG. 3b is a cross-sectional view taken along line A-A' of FIG. 3a.

FIG. 3c is a cross-sectional view taken along line B-B' of FIG. 3a.

FIG. 4b is a cross-sectional view taken along line A-A' of FIG. 4a.

FIG. 4c is a cross-sectional view taken along line B-B' of FIG. 4a.

FIG. 5b is a cross-sectional view taken along line A-A' of FIG. 5a.

FIG. 5c is a cross-sectional view taken along line B-B' of FIG. 5a.

FIG. 6b is a cross-sectional view taken along line A-A' of FIG. 6a.

FIG. 6c is a cross-sectional view taken along line B-B' of FIG. 6a.

FIG. 7b is a cross-sectional view taken along line A-A' of FIG. 7a,

FIG. 9b is a cross-sectional view taken along line A-A' of FIG. 9a

DETAILED DESCRIPTION

Figure 1:
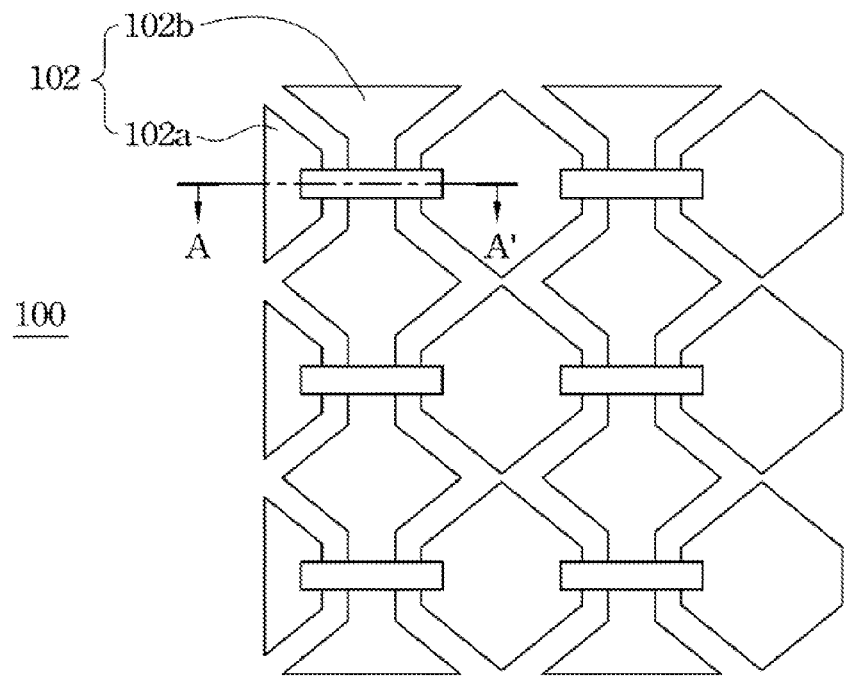
FIG. 1 is a top plan view illustrating a conventional capacitive type touch panel.
Figure 2:
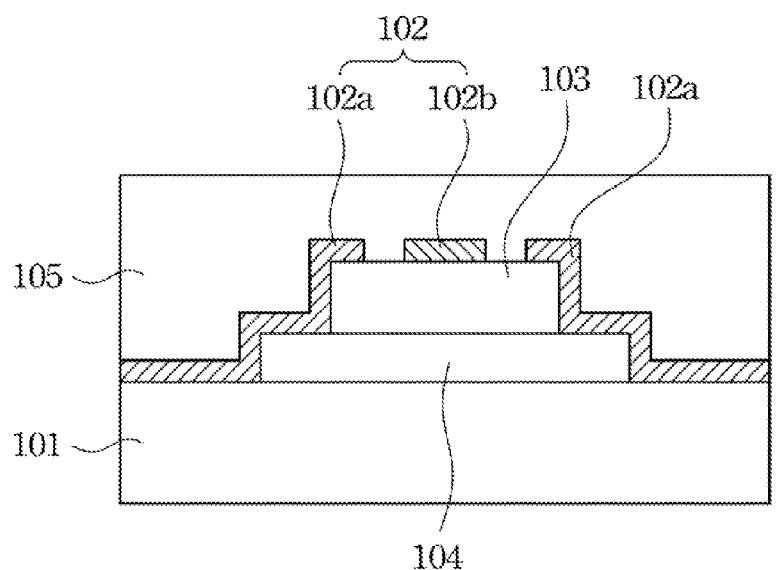
FIG. 2 is a cross-sectional view illustrating the touch panel taken along line A-A' of FIG. 1.

Reference will now be made in detail to the present embodiments of the invention, examples of which are illustrated in the accompanying drawings. Wherever possible, the same reference numbers are used in the drawings and the description to refer to the same or like parts.

Figure 3A:
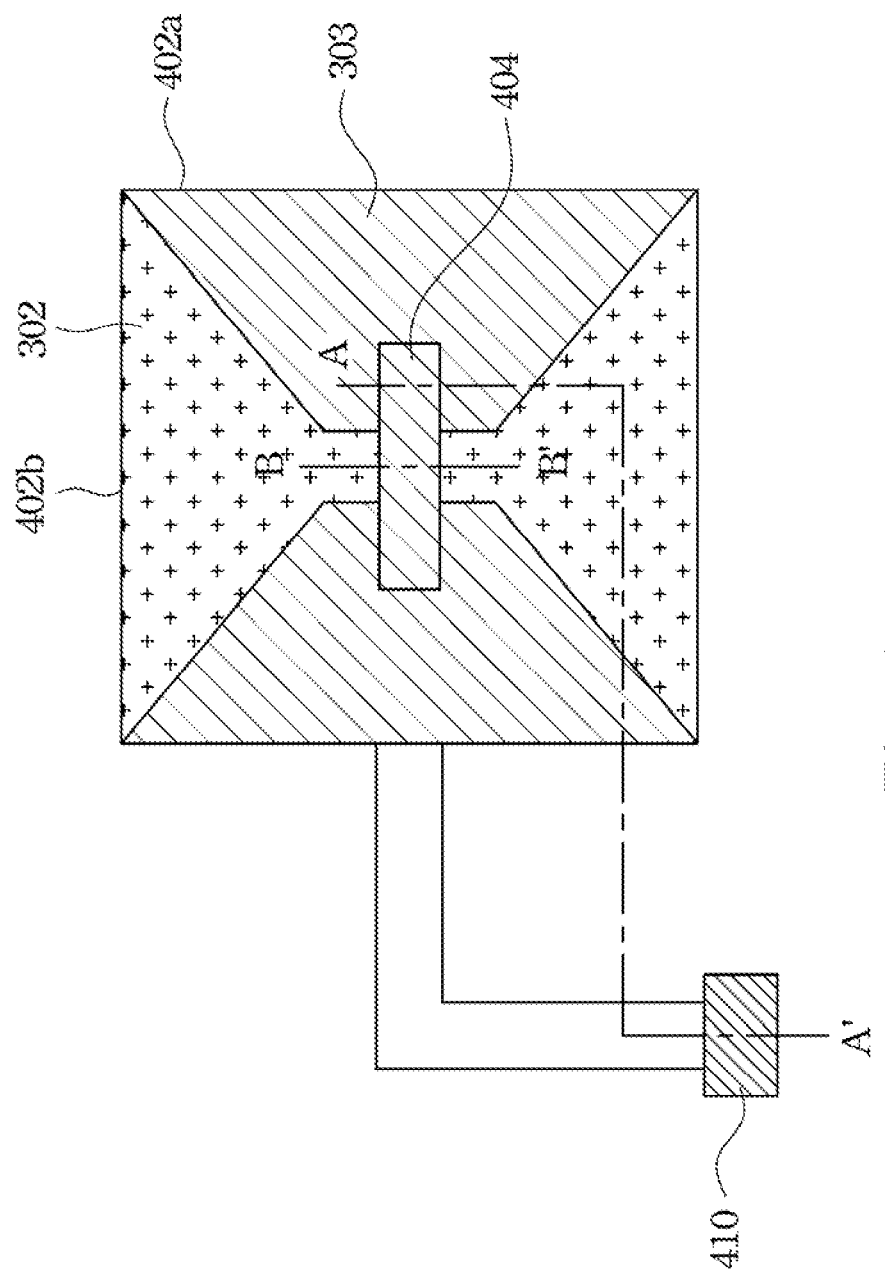
FIG. 3a is a top plan view illustrating to form a photo-resist layer with different thickness in a position for forming the metal bridge and the first sensing electrodes.
Figure 3B:
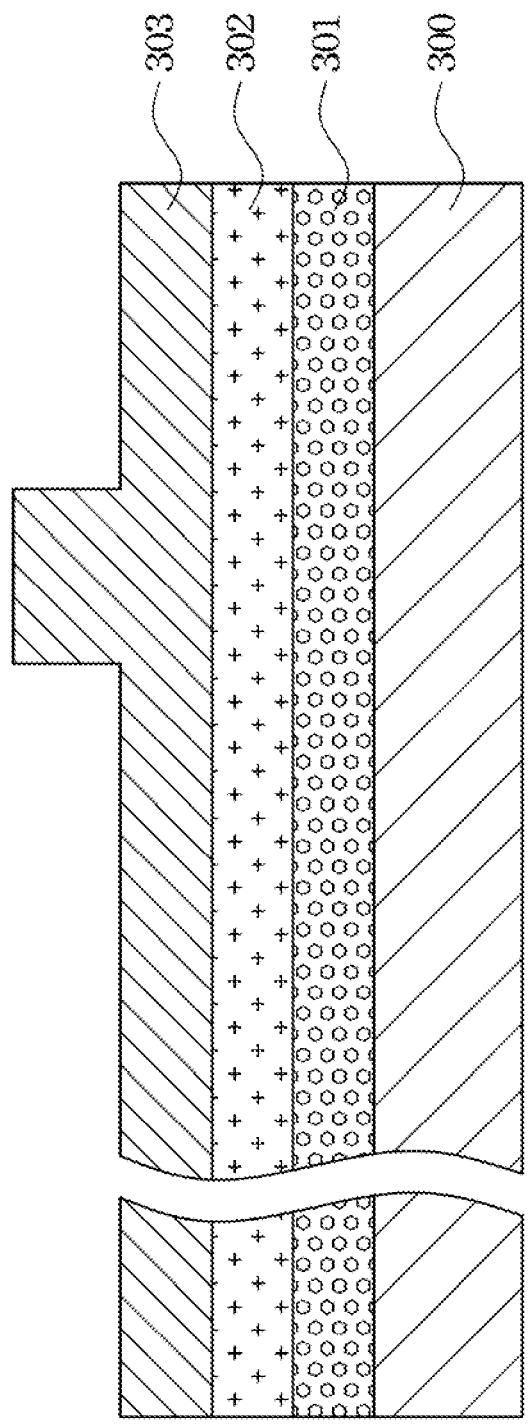
Figure 3C:
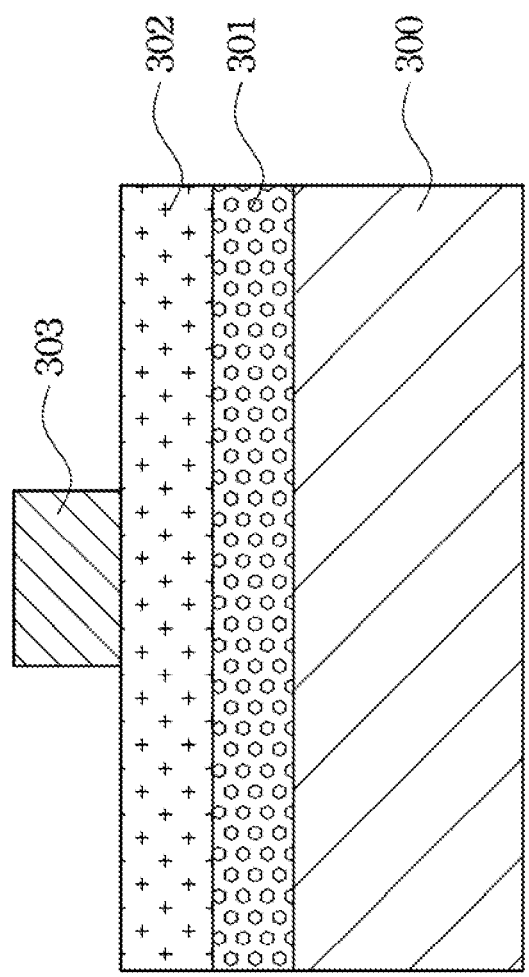

A method for forming a touch panel according to an example embodiment of this invention will be described in the following. Referring to FIG. 3a, FIG. 3b and FIG. 3c, FIG. 3a is a top plan view illustrating to form a photo-resist layer with different thickness in a position for forming the metal bridge and the first sensing electrodes. FIG. 3b is a cross-sectional view taken along line A-A' of FIG. 3a. FIG. 3c is a cross-sectional vie taken along line B-B' of FIG. 3a. It is noticed that only partial first sensing electrode 402a, partial second sensing electrode 402b and a connection pad 410 are illustrated in this FIG. 3a. The connection pad 410 is disposed surrounded the touch panel.

A first conductive layer 301 is formed on the substrate 300. A second conductive layer 302 is formed on the first conductive layer 301. A glass, plastic or transparent material is used to form the substrate 300. The first conductive layer 301 and the second conductive layer 302 are formed on the substrate 300 through a deposition process such as a sputtering method or a physical vapor deposition method. Here, as a material forming the first conductive layer 301 is indium tin oxide, ITO. As a material forming the second conductive layer 302 is indium tin oxide, ITO or a compound metal. The compound metal is selected from Pd, Pt, Au, Ag, Cr, Al, AlNd or combinations thereof.

Next, a photo-resist layer is formed on the second conductive layer 302. Then, the photo-resist layer is patterned by using a gray-level mask. The gray-level mask may be a half-tone mask, and is formed with a plurality regions on a transparent substrate, each of which has different light transmittance and may be a gray tone pattern or a slit pattern. When light passes through the half-tone mask with different light-transmittances, the photo-resist layer disposed below the half-tone mask is exposed to different exposure degrees based on the regions of the half-tone mask, thereby forming the patterned photo-resist layer having different thicknesses. In this embodiment, the gray level mask is a half-tone mask. Different gray tone pattern is formed on a transparent substrate. When light passes through the half-tone mask, the photo-resist layer disposed below the gray-tone mask is exposed to different exposure degrees thereby forming a patterned photo-resist layer 303 that has different thicknesses on these positions where the metal bridge 404 for connecting adjacent first sensing electrodes, the first sensing electrodes 402a, X-axis direction electrodes, and the connection pad 410 will be formed. Moreover, the second conductive layer 302 located in a position where the second sensing electrodes will be formed is also exposed by the patterned photo-resist layer 303.

Figure 4A:
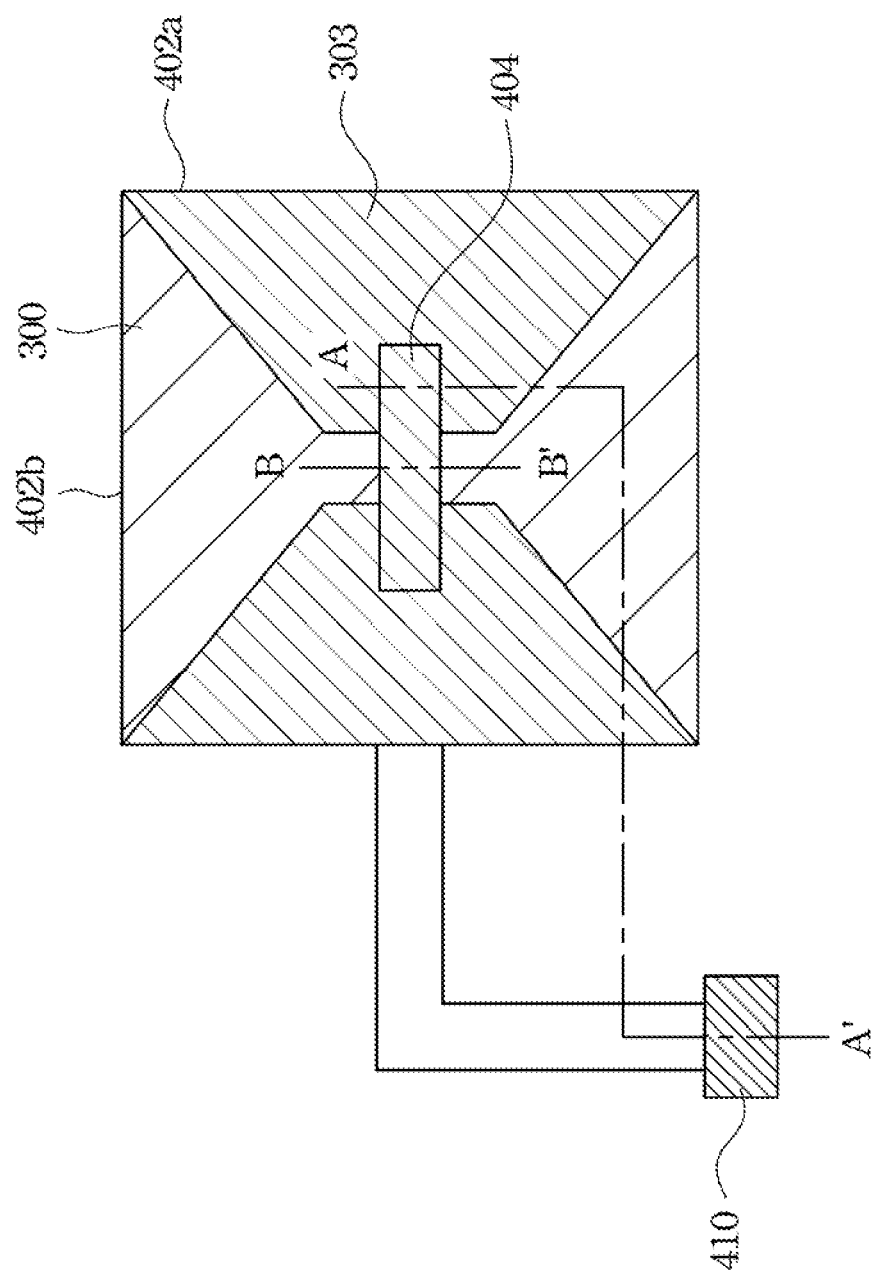
FIG. 4a is a top plan view illustrating to etch the first conductive layer and the second conductive layer using the patterned photo-resist layer.
Figure 4B:
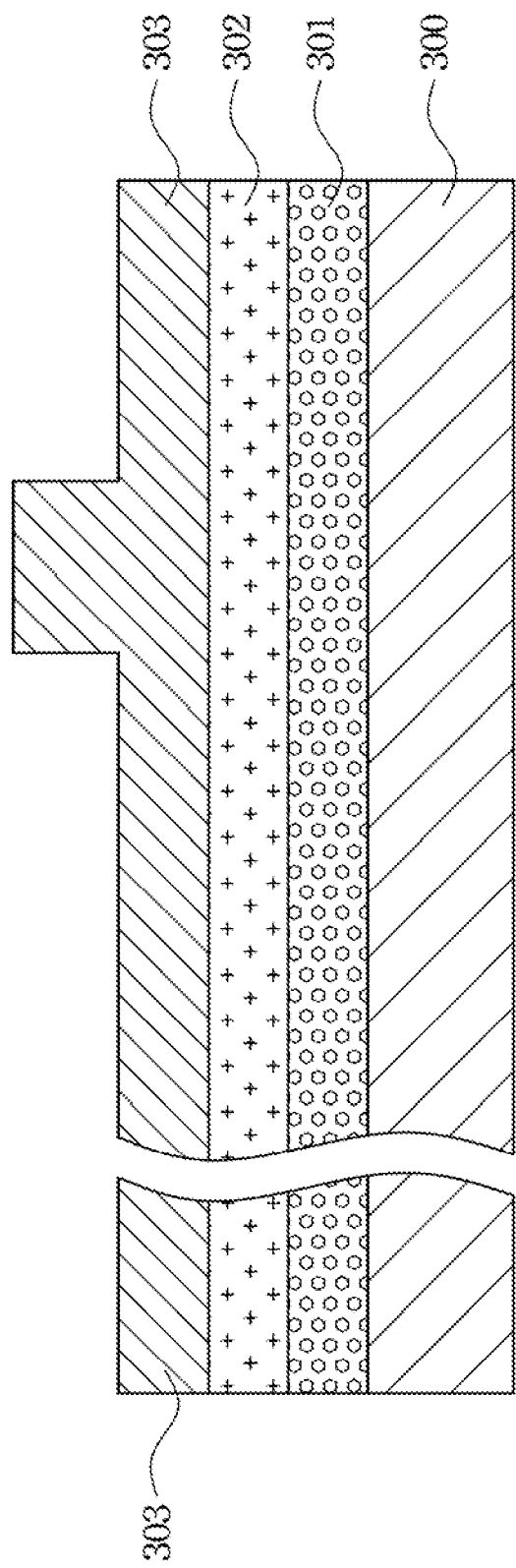
Figure 4C:
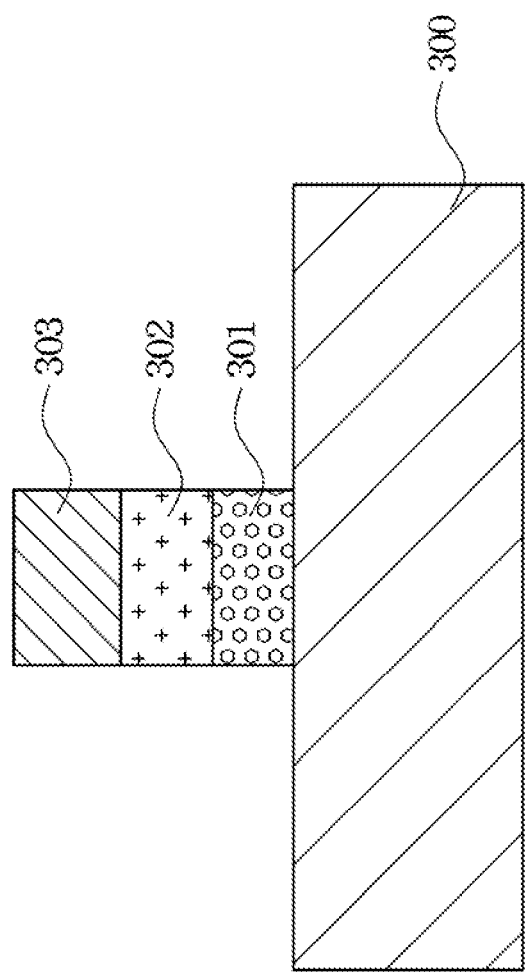

Next, referring to FIG. 4a, FIG. 4b and FIG. 4c, FIG. 4a is a top plan view illustrating to etch the first conductive layer and the second conductive layer using the patterned photo-resist layer. FIG. 4b is a cross-sectional view taken along line A-A' of FIG. 4a. FIG. 4c is a cross-sectional view taken along line B-B' of FIG. 4a. The patterned photo-resist layer 303 is used as a mask to remove the exposed second conductive layer 302 located in two sides of the metal bridge 404 in which the second sensing electrodes 402b will be formed by a wet etching process or a dry etching process to expose the first conductive layer 301. Then, The patterned photo-resist layer 303 is used as a mask again to remove the exposed first conductive layer 301 located in two sides of the metal bridge 404 in which the second sensing electrodes 402b will be formed by a wet etching process or a dry etching process to expose the substrate 300. In an embodiment, the wet etching process comprises an aqueous solution of mixture of hydrogen peroxide, phosphoric acid and hydrofluoric acid.

Figure 5A:
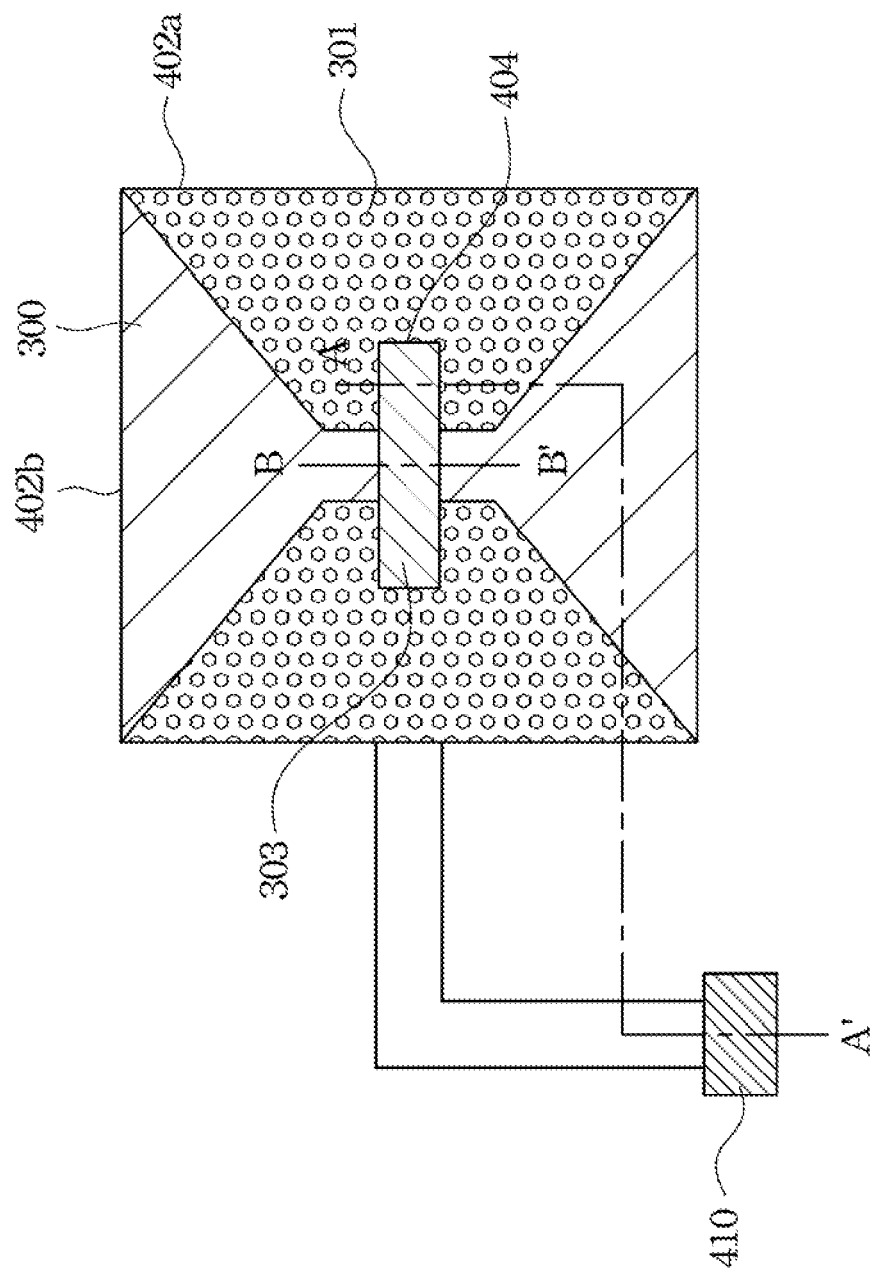
FIG. 5a is a top plan view illustrating to remove partial patterned photo-resist layer and etch the second conductive layer.
Figure 5B:
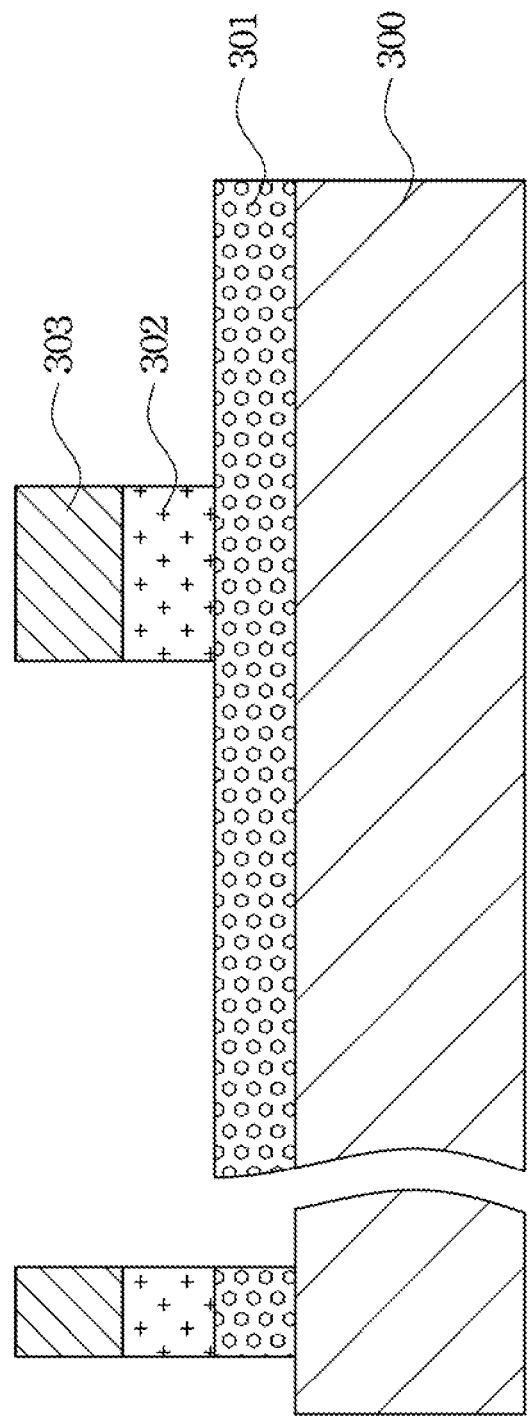
Figure 5C:
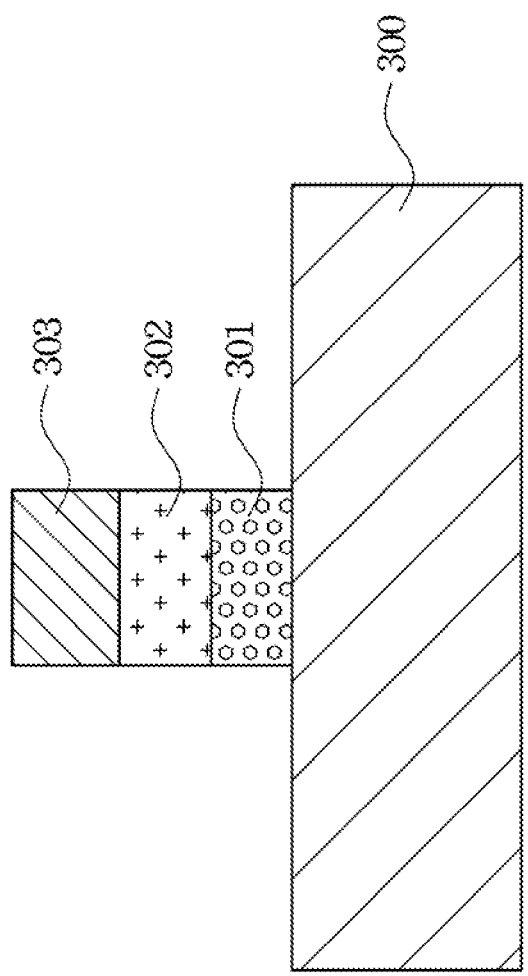

Next, referring to FIG. 5a, FIG. 5b and FIG. 5c, FIG. 5a is a top plan view illustrating to remove partial patterned photo-resist layer and etch the second conductive layer. FIG. 5b is a cross-sectional view taken along line A-A' of FIG. 5a. FIG. 5c is a cross-sectional view taken along line B-B' of FIG. 5a. The patterned photo-resist layer 303 located in two sides of the metal bridge 404 in which the first sensing electrodes 402a will be formed is removed by an ashing process to expose the second conductive layer 302. Then, the exposed second conductive layer 302 is etched, using a wet etching process or a dry etching process, to expose the first conductive layer 301. An annealing process is selectively performed to form a polycrystallization first conductive layer 301 before the second conductive layer is removed. This annealing process may prevent the first conductive layer 301 is etched while the second conductive layer is removed. In another embodiment, the first conductive layer 301 and the second conductive layer 302 are made by different material to prevent that the first conductive layer 301 is etched while the second conductive layer is removed.

Figure 6A:
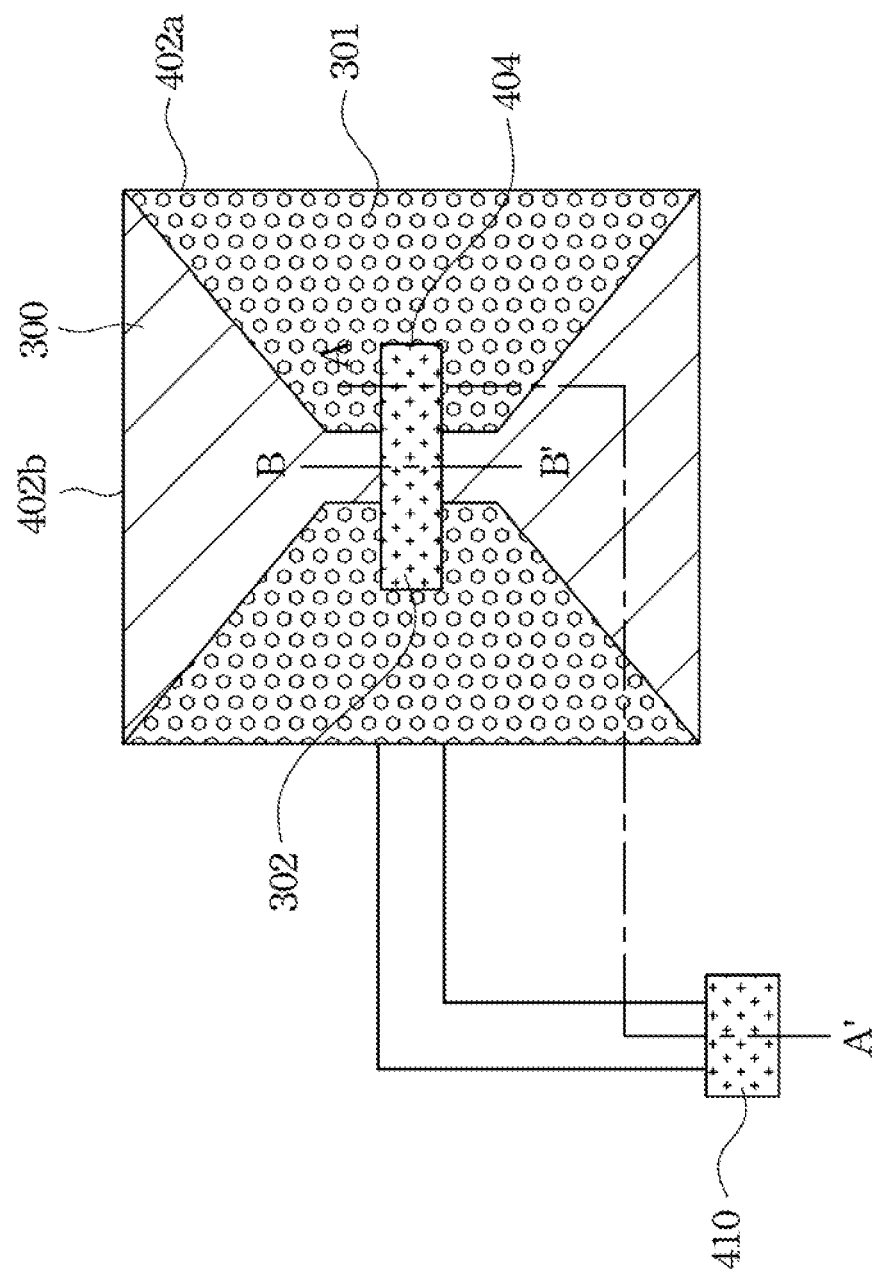
FIG. 6a is a top plan view illustrating to remove the patterned photo-resist layer.
Figure 6B:
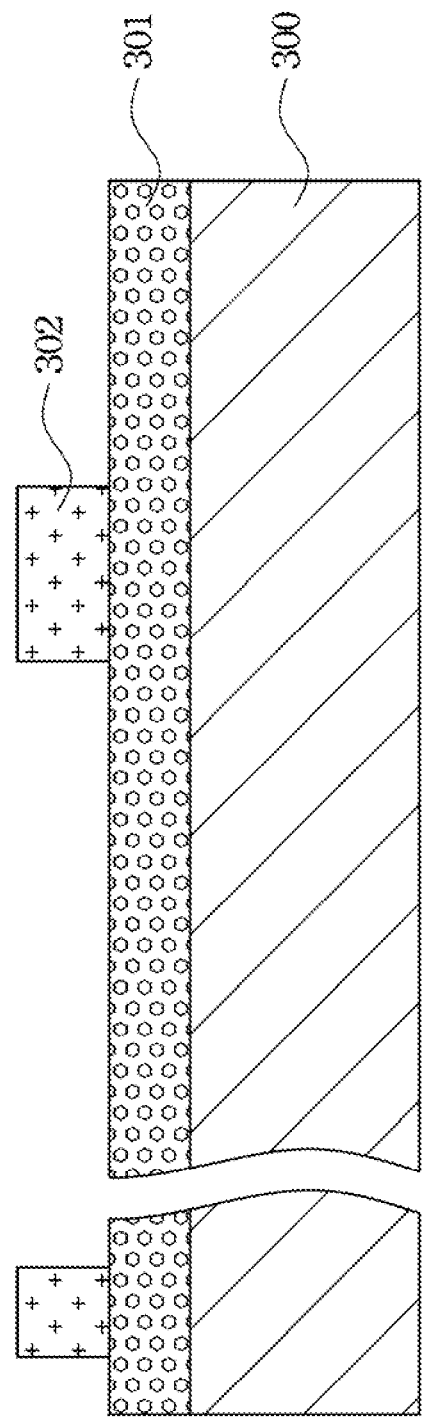
Figure 6C:
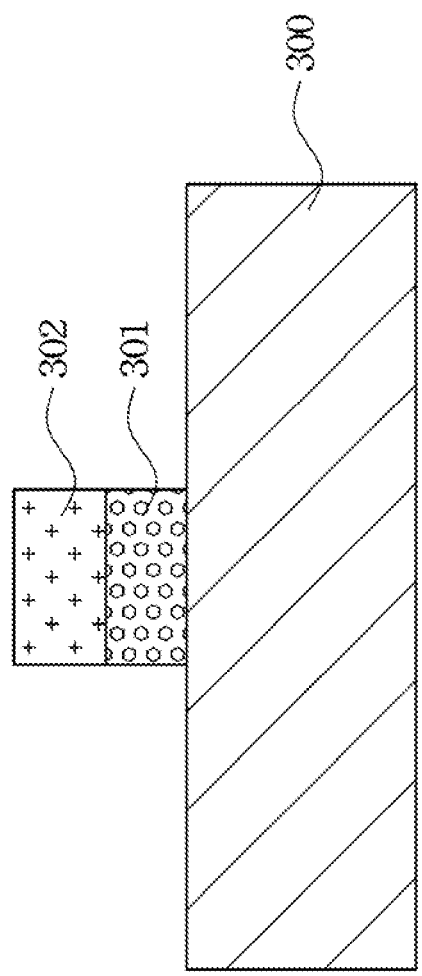

Next, referring to FIG. 6a, FIG. 6b and FIG. 6c, FIG. 6a is a top plan view illustrating to remove the patterned photo-resist layer. FIG. 6b is a cross-sectional view taken along line A-A' of FIG. 6a. FIG. 6c is a cross-sectional view taken along line B-B' of FIG. 6a. The patterned photo-resist layer 303 located on the metal bridge 404 is removed by an asking process to expose the second conductive layer 302. Accordingly, the first sensing electrodes 402a, the metal bridge 404 and the connection pad 410 are finished.

Figure 7A:
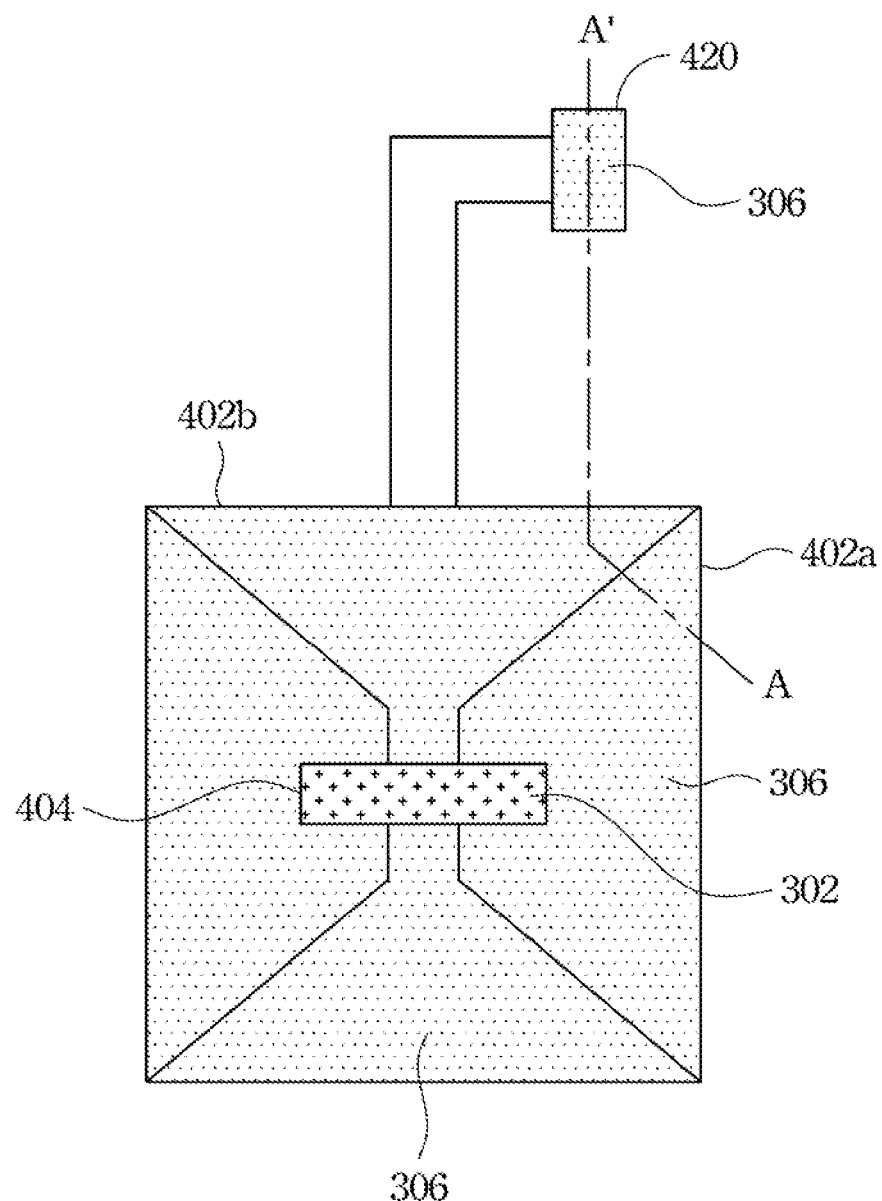
FIG. 7a is a top plan view illustrating to form a protection layer and a third conductive layer.

Then, the second sensing electrodes 402b, Y-axis direction electrodes, and the connection pad 420 are fabricated. The connection pad 420 is fabricated on the connection pad 410 to form a structure connected with the second sensing electrodes 402b. Referring to FIG. 7a, FIG. 7b and FIG. 7c, FIG. 7a is a top plan view illustrating to form a protection layer and a third conductive layer. FIG. 7b is a cross-sectional view taken along line A-A' of FIG. 7a. An insulation layer 305 is formed in the substrate 300. The material for forming the insulation layer 305 is an organic photo-resist material or a transparent material. Then, the insulation layer 305 is patterned by using a gray-level mask. The gray-level mask may be a half-tone mask. When light passes through the half-tone mask with different light-transmittances, the insulation layer 305 disposed below the half-tone mask is exposed to different exposure degrees, thereby forming the patterned insulation layer 305 having different thicknesses. The thickness of the insulation layer 305 over the first sensing electrodes 402a is larger than that of the insulation layer 305 over the second sensing electrodes 402b. Next, a third conductive layer 306 is formed on the insulation layer 305 and the second conductive layer 305 located over the connection pad 410 through a deposition process such as a sputtering method or a physical vapor deposition method. The material for forming the third conductive layer is indium tin oxide (ITO).

Figure 8:
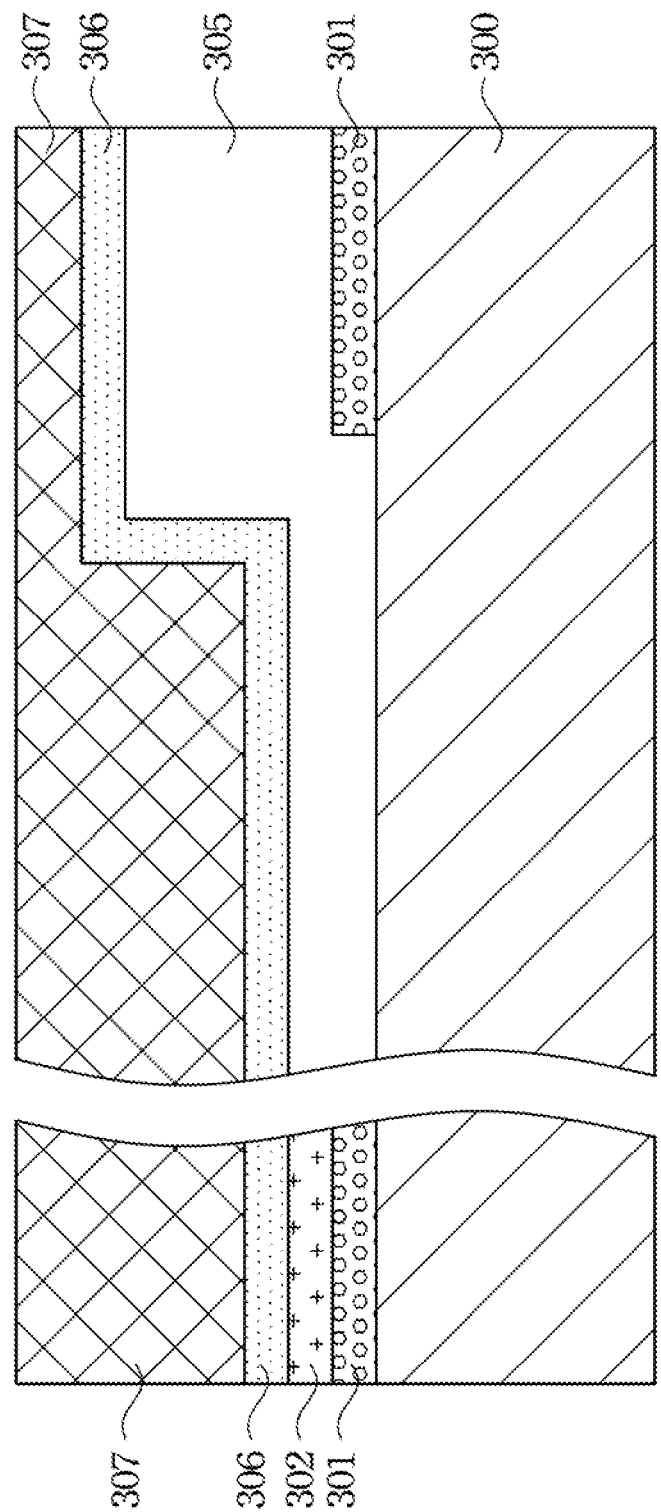
FIG. 8 is a cross-sectional view illustrating to form a photo-resist layer on the third conductive layer.

Referring to FIG. 8, FIG. 8 is a cross-sectional view illustrating to form a photo-resist layer on the third conductive layer. A photo-resist layer 307 is formed on the third conductive layer 306. In an embodiment, a spin coating method is used to form the photo-resist layer 307 on the third conductive layer 306. The thickness of the photo-resist layer 307 has to be larger than that of the step of the patterned insulation layer 305.

Figure 9A:
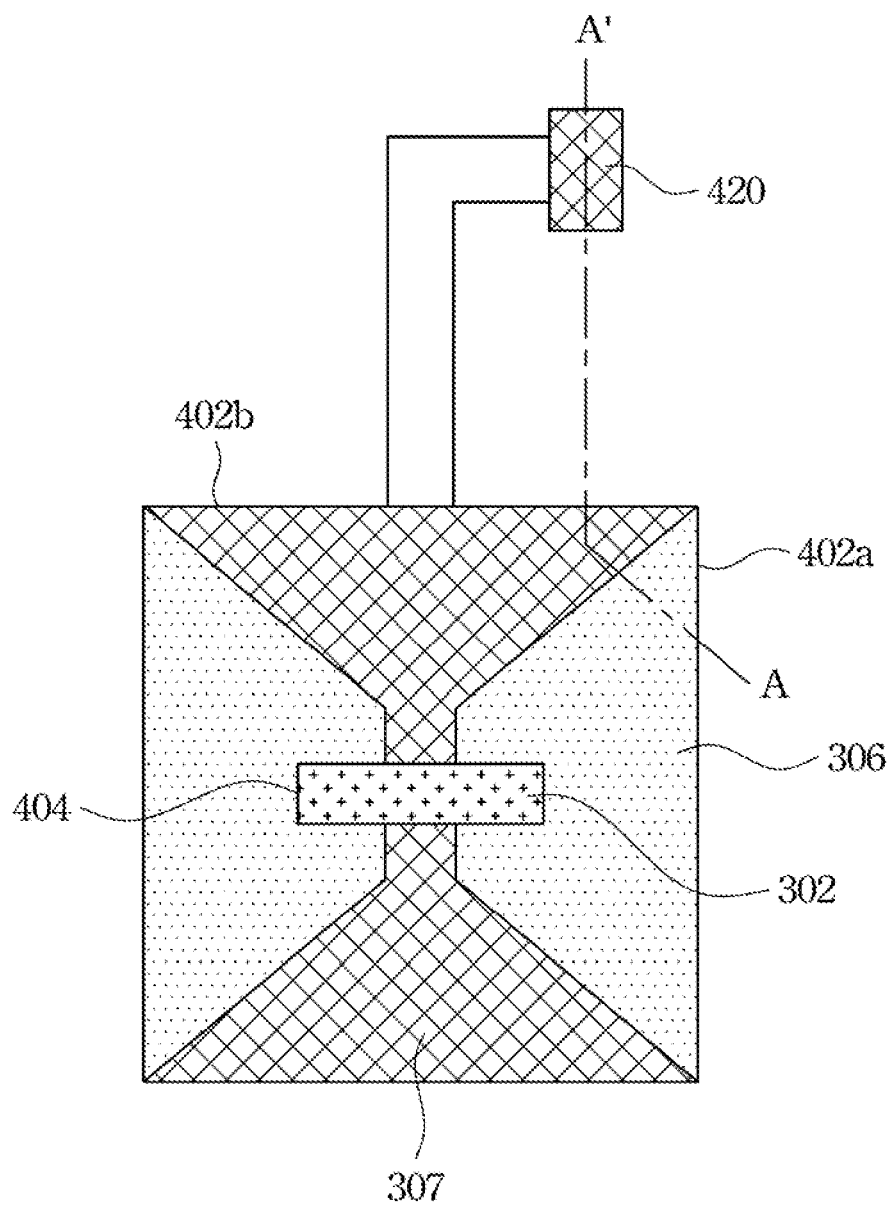
FIG. 9a is a top plan view illustrating to pattern the photo-resist layer on the third conductive layer.

Referring to FIG. 9a and FIG. 9b, FIG. 9a is a top plan view illustrating to pattern the photo-resist layer on the third conductive layer. FIG. 9b is a cross-sectional view taken along line A-A of FIG. 9a. The photo-resist layer 307 located in the position where the first sensing electrodes 402a will be formed and in the position where the first sensing electrodes 402a cross the second sensing electrodes 402b is removed by an ashing process to expose the third conductive layer 306.

Figure 10:
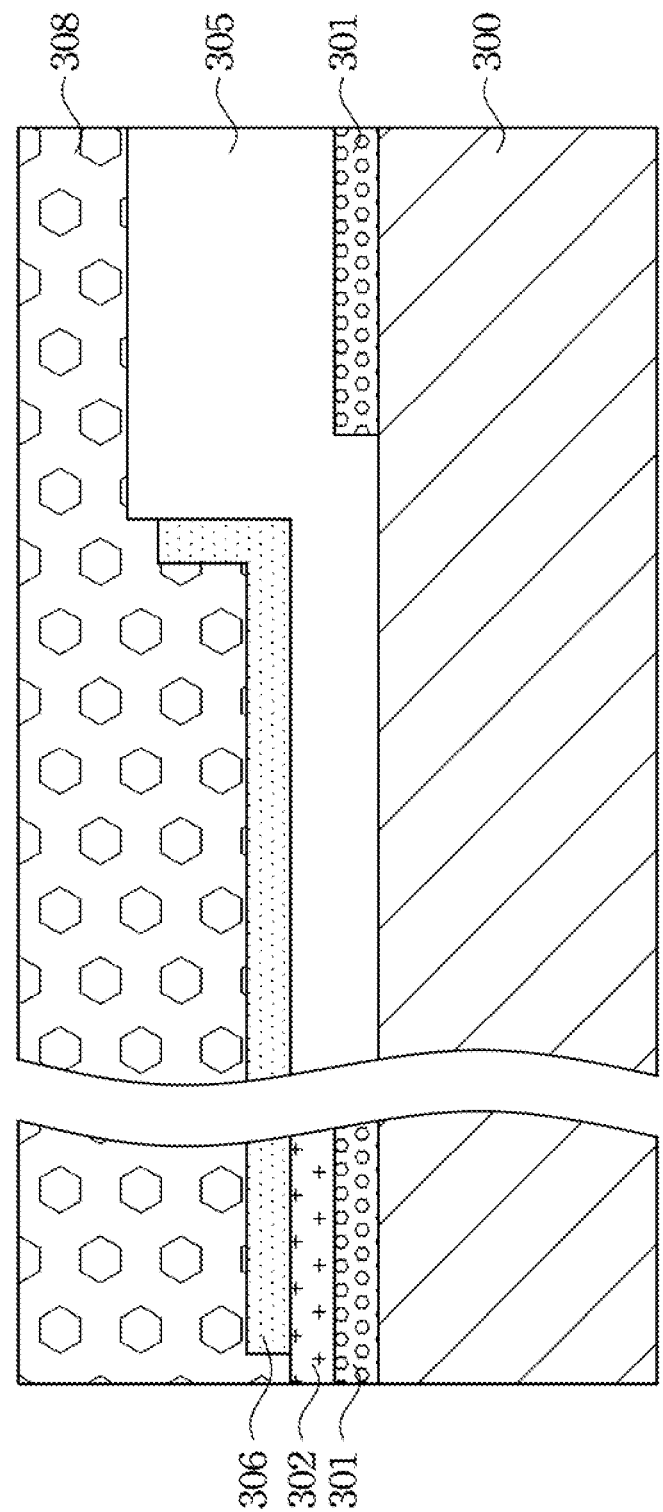
FIG. 10 is a cross-sectional view illustrating to etch the exposed third conductive layer and form an insulation layer on the third conductive layer.

Referring to FIG. 10, FIG. 10 is a cross-sectional view illustrating to etch the exposed third conductive layer and form an insulation layer on the third conductive layer. The exposed third conductive layer 306 is etched by a wet etching process or a dry etching process to expose the insulation layer 305. An insulation layer 308 is formed on the substrate 300 and the exposed insulation layer 305 to finish the capacitive touch panel. The material for forming the insulation layer 308 is an organic photo-resist material or a transparent material.

Accordingly, in the present invention a gray-level mask is applied to define the electrodes, X-axis direction electrodes and Y-axis direction electrodes. Therefore, the typical four mask processes may be reduced to three mask processes. The fabrication cost and time are much reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of fabricating a touch panel, comprising the steps of:
    forming a first conductive layer, a second conductive layer and a first photo-resist layer on a substrate sequentially;
    applying a first gray-level mask to pattern the first photo-resist layer;
    using the patterned first photo-resist layer to etch the first conductive layer and the second conductive layer so as to define a plurality of first sensing electrodes of the touch panel;
    forming a first insulation layer on the substrate and the first sensing electrodes;
    applying a second gray-level mask to pattern the first insulation layer so as to form a patterned first insulation layer having different thicknesses, wherein the patterned first insulation layer over the first sensing electrodes has the largest thickness;
    forming a third conductive layer on the patterned first insulation layer;
    forming a second photo-resist layer on the third conductive layer;
    patterning the second photo-resist layer to expose partial the third conductive layer; and
    using the patterned second photo-resist layer to etch the third conductive layer so as to define a plurality of second sensing electrodes of the touch panel.

2. The method of fabricating a touch panel of claim 1, wherein a material of the first conductive layer and the third conductive layer is indium tin oxide (ITO).

3. The method of fabricating a touch panel of claim 1, wherein a material for forming the second conductive layer is indium tin Oxide (ITO) or a metal alloy.

4. The method of fabricating a touch panel of claim 1, wherein the first conductive layer, the second conductive and the third conductive layer are etched by a wet etching process or a dry etching process.

5. The method of fabricating a touch panel of claim 1, wherein a material of the substrate is selected from the group consisting of glass, plastic and transparent material.

6. The method of fabricating a touch panel of claim 1, wherein the step of applying the first gray-level mask to pattern the first photo-resist layer further comprises the steps of:
- patterning the first photo-resist layer located in a position of the first sensing electrodes to be formed to have a first thickness and a second thickness, wherein the second thickness is less than the first thickness; and
- removing the first photo-resist layer located in a position of the second sensing electrodes to be predefined formed.

7. The method of fabricating a touch panel of claim 6, wherein the step of using the patterned first photo-resist layer to etch the first conductive layer and the second conductive layer to define the first sensing electrodes of the touch panel further comprises the steps of:
- using the patterned first photo-resist layer to each the second conductive layer and the first conductive layer so as to expose the substrate located in the position of the second sensing electrodes to be formed;
- removing the second thickness from the patterned first photo-resist layer to expose the second conductive layer located in the position of the second sensing electrodes to be formed;
- etching the exposed second conductive layer to expose the first conductive layer; and
- removing the remained patterned first photo-resist layer.

8. The method of fabricating a touch panel of claim 7, further comprising performing an annealing process before etching the exposed second conductive layer to expose the first conductive layer.

9. The method of fabricating a touch panel of claim 1, further comprising forming a second insulation layer on the first sensing electrodes and the second sensing electrodes.

10. The method of fabricating a touch panel of claim 9, wherein the first insulation layer and the second insulation layer are organic photo-resist layers.

11. The method of fabricating a touch panel of claim 1, wherein the step of using the patterned first photo-resist layer to etch the first conductive layer and the second conductive layer so as to define the first sensing electrodes of the touch panel further comprises defining a first connection pad on the substrate, wherein the first connection pad is connected to the first sensing electrodes.

12. The method of fabricating a touch panel of claim 11, wherein the step of applying a second gray-level mask to pattern the first insulation layer further comprises exposing the first connection pad.

13. The method of fabricating a touch panel of claim 12, wherein the step of forming a third conductive layer on the patterned first insulation layer further comprises forming the third conductive layer on the exposed first connection pad to form a second connection pad, wherein the second connection pad is connected to the second sensing electrodes.

* * * * *